US006778736B2

(12) United States Patent
Markwardt et al.

(10) Patent No.: US 6,778,736 B2
(45) Date of Patent: Aug. 17, 2004

(54) DYNAMIC VARIABLE OPTICAL ATTENUATOR AND VARIABLE OPTICAL TAP

(75) Inventors: Terry L. Markwardt, Austin, TX (US); Leif G. Fredin, Austin, TX (US); Ray T. Chen, Austin, TX (US); Ram Sivaraman, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 18 days.

(21) Appl. No.: 10/098,050

(22) Filed: Mar. 14, 2002

(65) Prior Publication Data

US 2002/0131712 A1 Sep. 19, 2002

Related U.S. Application Data

(60) Provisional application No. 60/276,182, filed on Mar. 15, 2001.

(51) Int. Cl.[7] .............................................. G02B 6/42
(52) U.S. Cl. .............................. 385/40; 385/16; 385/43; 385/140
(58) Field of Search ........................ 385/2, 8, 16–20, 385/24, 37, 40, 43, 140, 14

(56) References Cited

U.S. PATENT DOCUMENTS

| 4,753,505 A | * | 6/1988 | Mikami et al. ............... 385/43 |
| 5,500,913 A | | 3/1996 | Allen et al. .................... 385/48 |
| 5,657,155 A | | 8/1997 | Cheng ......................... 359/341 |
| 5,703,708 A | | 12/1997 | Das et al. .................... 359/140 |
| 5,708,265 A | | 1/1998 | Poole ..................... 250/227.14 |
| 6,115,519 A | | 9/2000 | Espindola et al. ............. 385/43 |
| 6,175,671 B1 | | 1/2001 | Roberts ........................ 385/14 |
| 6,301,425 B1 | | 10/2001 | Espindola et al. .......... 385/140 |
| 6,311,004 B1 | | 10/2001 | Kenney et al. .............. 385/130 |
| 6,341,024 B1 | | 1/2002 | Jeong .......................... 359/130 |
| 6,351,329 B1 | | 2/2002 | Greywall .................... 359/290 |

FOREIGN PATENT DOCUMENTS

| EP | 0 367 682 | 5/1990 |
| FR | 2 765 974 A | 1/1999 |

OTHER PUBLICATIONS

Thylen L: "Integrated Optics In LINB03: Recent Developments in Devices for Telecommunications," vol. 6, No. 6, Jun. 1, 1988, Journal Of Lightwave Technology, IEEE, New York, U.S..

Annex to Form PCT/ISA/206—Comunication Relating to the Results of the Partial International Search dated Jan. 24, 2003.

* cited by examiner

*Primary Examiner*—Phan T. H. Palmer
(74) *Attorney, Agent, or Firm*—Workman Nydegger

(57) ABSTRACT

An optical device with at least one junction formed by an intersection of at least two waveguides may be used to tap, and/or attenuate an optical signal. The waveguides may be formed from various materials such as polymers and other combinations of monomers. Internal reflection produced at each junction between the waveguides in response to heating from a thin film electrode will direct a portion of an optical signal from one of the waveguides to another waveguide. Internal reflection at each junction may be used to selectively tap and/or attenuate power level of an optical signal.

19 Claims, 6 Drawing Sheets

DYNAMIC VARIABLE OPTICAL ATTENUATOR AND VARIABLE OPTICAL TAP

RELATED APPLICATION

This application claims priority from U.S. Provisional Patent Application Serial No. 60/276,182, filed Mar. 15, 2001, and entitled "Miniaturized Reconfigurable DWDM Add/Drop System for Optical Communication Systems."

This application claims priority from co-pending application Ser. No. 09/999,054, filed Nov. 1, 2001 entitled "N×N Optical Switching Devices Based on Thermal-Optics Induced Total Internal Reflection Effect", which claims priority from provisional Application Serial No. 60/259,446, filed Jan. 2, 2001.

This application claims priority from co-pending application Ser. No. 10/097,756, filed Mar. 14, 2002 entitled "Combined Multiplexer and Demultiplexer for Optical Communication Systems", which claims priority from U.S. Provisional Patent Application Serial No. 60/276,182, filed Mar. 15, 2001, all of which are incorporated herein by reference.

TECHNICAL FIELD OF THE INVENTION

The present invention is related to tapping optical signals and attenuating optical signals and more particularly to equipment and methods which provide dynamic variable tapping and/or dynamic variable attenuation of optical signals in a fiber optic network.

BACKGROUND OF THE INVENTION

Increased demand for data communication and growth of the internet have resulted in increased demand for communication capability within metropolitan areas. There has also been an equally large increase in demand for communication capability between large metropolitan areas. Optical communication systems formed by networks of fiber optic cables are being developed and installed to meet this increased demand.

Various types of optical switches and techniques are currently used in communication systems and computer systems. Many currently available optical switches are based upon optoelectric and electrooptic conversion of light signals and electrical signals within the associated optical switch. One type of presently available optical switch includes a matrix of thermooptic switching elements interconnected by waveguides formed on a silica substrate. Switching of light signals is accomplished by the use of thin film heaters to vary the temperature of the switching elements. Electrical circuits are also provided to supply switching current to the heaters. A heat sink may be provided to dissipate heat caused by the switching operations. One example of such switches is shown in U.S. Pat. No. 5,653,008.

Some presently available optical switches include a semiconductor substrate with vertical current flow to heat active regions of an associated optical switch. One example of such switches is shown in U.S. Pat. No. 5,173,956. Some optical switches require mode perturbation to generate required mode patterns for the desired switching function. Examples of such optical switches include directional couplers and Mach Zhender interferometers. Such optical switch designs often have poor scalability, relatively high manufacturing costs and low optical signal bandwidth.

Various types of optical signal amplifiers, wavelength division demultiplexers, optical switches, wavelength division multiplexers and techniques are currently used in optical communication systems. Optical signal amplifiers, wavelength division multiplexers and demultiplexers and other components associated with optical communication systems typically function best when respective signal levels of associated optical signals are substantially equal with each other. A variation in signal level of multiple wavelength optical signals may result in an undesirable signal to noise ratio and resulting poor performance by switches, amplifiers and other optical components.

Multiple wavelength optical signals are often collectively amplified by a light amplifier. The amplification factor of many light amplifiers is dependent upon the wavelength of each optical signal. Therefore, amplification factors for multiple wavelength optical signals often vary depending on the specific wavelength of each signal. The resulting difference between signal levels of respective multiple wavelength optical signals amplified by a single amplifier is often relatively small. However, when a large number of light amplifiers (ten or more) are used in a fiber optic communication system, the variation in signal levels becomes cumulative and may result in unsatisfactory lowering of associated signal to noise ratios. Therefore, variable optical attenuators are often provided at the input stage and/or output stage of light amplifiers in both large metropolitan communication systems and long distance fiber optic communication systems to adjust signal levels of multiple wavelength light signals to maintain desired signal to noise ratios.

Variable optical attenuators are often included in optical communication systems to maintain a desired signal level for each optical signal or wavelength. Examples of variable optical attenuators (VOA) include natural density filters which are often used to suppress the amount of light depending on wavelength characteristics. Other variable optical attenuators include mechanical devices which position a glass substrate so that light signals may be attenuated by varying the position of the glass substrate. Still other variable optical attenuators attenuate light signals by rotating the polarization of each light signal as it passes through a Faraday element.

Optical taps are also included in many optical communication systems to monitor both performance of individual components and performance of the overall system.

SUMMARY OF THE INVENTION

In accordance with teachings of the present invention, a system and method are provided to attenuate optical signals and/or tap optical signals and to substantially reduce or eliminate disadvantages and problems associated with presently available optical systems. The present invention provides a dynamic variable optical attenuator and a dynamic variable optical tap which use substantially total internal reflection (TIR) at junctions formed by two waveguides intersecting with each other at a selected angle. For some applications, the desired internal reflection will occur at a junction between the two waveguides in response to heating from a thin film electrode. For other applications, the desired internal reflection may be produced by electrooptic, magnetooptic or acoustooptic effects. A dynamic variable optical attenuator and dynamic variable optical tap formed in accordance of teaching of the present invention are satisfactory for use with optical systems that communicate at very high data-rates between terminals.

Technical advantages of the present invention include a low cost, reliable optical attenuator and/or optical tap which may be formed as separate, individual components or may be integrated with other components, such as optical switches. An optical attenuator or tap incorporating teachings of the present invention is intrinsically a wide band device covering all S-band, C-band and L-band optical signals. The optical attenuator or optical tap may be fabricated on a wide variety of materials such as polymer/$SiO_2$, polymer/polymer, polymer/polymer/polymer and semi-insulating/semiconductor substrates. The optical attenuator or tap may be used in general purpose optical communication systems including fiber optic networks associated with modern metropolitan communication systems.

One aspect of the present invention includes a dynamic, variable optical tap having at least a two channel waveguide array. Each junction formed by each intersection of the waveguides is relatively small which substantially eliminates cross talk between the respective waveguides while maintaining a relatively large dynamic range of low-cross talk. Therefore, the optical tap has a relatively small insertion loss. Beam propagation methods (BPM) may be used to determine characteristics, such as dynamic range, of each junction. A respective electrode may be disposed on each junction or intersection of the waveguides along with an electrical current input port. Current may be introduced from the input port to flow through the electrode to the grounding port to create sufficient heat by the electrode to modulate the index of refraction within portions of the waveguides disposed adjacent to the electrode. As a result of heat created by the electrode, the index of refraction may be reduced. The portion of the junction disposed adjacent to the electrode may encounter total internal reflection which provides desired taping of optical signals communicated through one of the waveguides. The location of the electrode may be selected in accordance with teachings of the present invention to maximize optical efficiency of the tap.

Another aspect of the present invention includes a dynamic, variable optical attenuator having at least a two channel waveguide array. Each junction formed by each intersection of the waveguides is relatively small which substantially eliminates cross talk between the respective waveguides while maintaining a relatively large dynamic range of low-cross talk. Therefore, the optical attenuator has a relatively small insertion loss. Beam propagation methods (BPM) may be used to determine characteristics, such as dynamic range, of each junction. A respective electrode may be disposed on each junction or intersection of the waveguides along with an electrical current input port and a grounding port. Current may be introduced from the input port to flow through the electrode to the grounding port to create sufficient heat by the electrode to modulate the index of refraction within portions of the waveguides disposed adjacent to the electrode. As a result of heat created by the electrode, the index of refraction may be reduced. The portion of the junction disposed adjacent to the electrode may encounter total internal reflection which provides desired attenuation of optical signals communicated through one of the waveguides. The location of the electrode may be selected in accordance with teachings of the present invention to maximize switching efficiency of the attenuator. For some applications an optical tap may be formed in accordance with teachings of the present invention on at least one of the waveguides associated with each optical attenuator.

Two dimensional arrays formed in accordance with teachings of the present invention may be satisfactorily integrated to form a wide variety of arrays such as two by two, eight by eight, sixteen by sixteen and sixty-four by sixty-four. The resulting arrays may be hermetically sealed using appropriate semiconductor fabrication techniques. An optical attenuator and/or tap formed in accordance with teachings of the present invention may be satisfactorily used in optical communication systems including fiber optic networks having cable lengths ranging from one hundred meters to thousands of kilometers.

Typical specifications for an optical attenuator and/or tap device formed in accordance with teachings of the present invention include cross talk between adjacent waveguides of less than thirty (30) dB, insertion loss of less than five (5) dB per waveguide, polarization independent return loss greater than forty (40) dB and relatively fast response time for a thermal optic device. For various applications the response time may range between less than twenty milliseconds to much less than a millisecond.

The quality of a light signal is generally determined by the ratio between the signal level and the intensity of noise associated with the signal level. This ratio is commonly referred to as the signal-to-noise ratio (SNR). Dynamic variable optical attenuators formed in accordance with teachings of the present invention may be satisfactorily used to adjust the intensity or signal level of multiple wavelength light signals communicated through an optical communication system to establish a desired signal-to-noise ratio for optimum performance of amplifiers, wavelength division multiplexers and demultiplexers and other components associated with optical communication systems.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
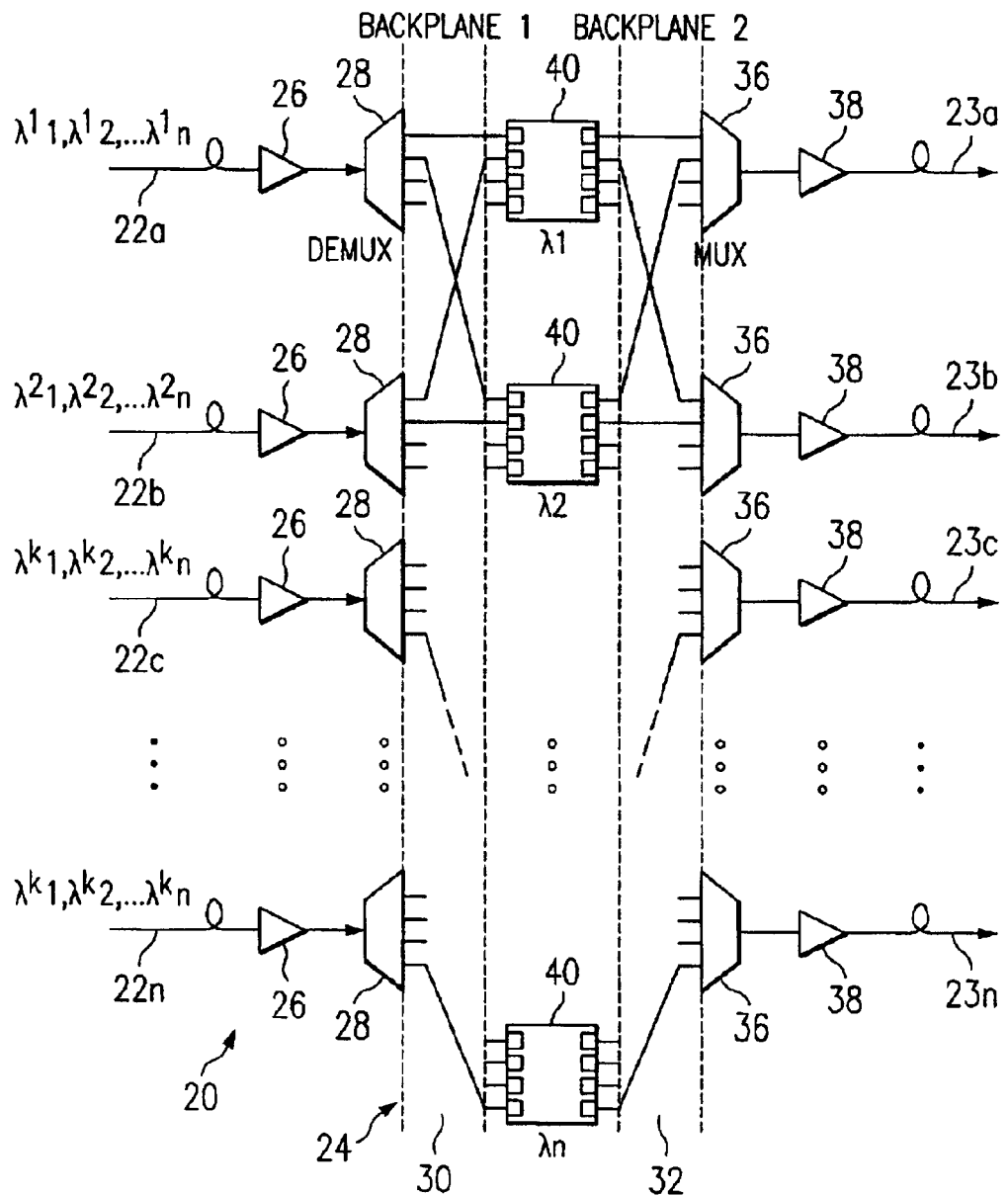
FIG. 1 is a schematic drawing showing various components associated with an optical communication system including a plurality of amplifiers and demultiplexers, a first backplane, a plurality of combined optical switches and dynamic variable optical attenuators, a second backplane, a plurality of multiplexers and amplifiers.

Preferred embodiments of the present invention and its advantages are best understood by referring to FIGS. 1 through 13 of the drawings, like numerals being used for like and corresponding parts of the various drawings.

The terms "optical signal or signals" and "light signal or signals" include all electromagnetic radiation which may satisfactorily communicate information through a waveguide and/or fiber optic cable. An optical tap or optical attenuator incorporating teachings of the present invention may be satisfactorily used with optical signals in the infrared, visible and ultraviolet spectrum. The optical tap or optical attenuator may be used with communication systems for digital information and analog information.

Optical devices incorporating teachings of the present invention may be satisfactorily used to tap optical signals for various monitoring purposes and to attenuate or reduce intensity of optical signals. Signal level and intensity may also be referred to as "optical power."

The term "waveguide" is used in this application to include the full range of optical signal conductors that may be satisfactorily used to communicate optical signals. A waveguide typically includes a core formed from a first optical material and disposed in a channel formed in a second optical material. A fiber optic cable is one example of a specific type of waveguide. However, waveguides satisfactory for use with the present invention may have various configurations other than fiber optic cables and cores disposed in a channel.

The terms "polymer" and "polymers" include any macromolecule combinations formed by chemical union of multiple, substantially identical combining units or monomers and have satisfactory characteristics for use as a waveguide for optical signals. Combinations of two, three or four monomers are often referred to respectively as dimers, trimers, and tetramers. These combinations may be further classified as inorganic, organic, natural, synthetic or semi-synthetic. For purposes of this application, the terms "polymers and other combinations of monomers" and "polymers or other combinations of monomers" means any combination of two or more monomers which may be satisfactorily used to form a waveguide in accordance with teachings of the present invention including, but not limited to, inorganic, organic, natural, synthetic and semisynthetic combinations.

A wide variety of polymers and other combinations of monomers may be satisfactorily used to form waveguides and optical devices in accordance with teachings of the present invention. The following discussion of some examples of chemical compounds is illustrative only and is not intended to limit the scope of the present invention.

Various features of the present invention will be described with respect to an optical signal as it travels from input fiber optic cables 22 to output fiber optic cables 23 (see FIG. 1) and from the input end of a waveguide to the output end of a waveguide. (See FIGS. 11 and 12.) However, dynamic, variable optical attenuators and dynamic, variable optical taps formed in accordance with teachings of the present invention may be satisfactorily used with a wide variety of optical signals, optical networks, optical communication systems and associated waveguides. The optical signals may carry digital information and/or analog information.

Communication system 20, as shown in FIG. 1, includes a plurality of fiber optic cables 22 and 23 and one or more switching centers 24. Communication system 20 may also include a wide variety of other components associated with modern fiber optic communication networks.

Wavelength division multiplexing (WDM) techniques allow each fiber optic cable 22 and 23 to carry multiple optical signals at various wavelengths which substantially increases the efficiency of each fiber optic cable 22 and 23. Recently, dense wavelength division multiplexing (DWDM) techniques have been developed to allow existing fiber optic networks to better satisfy increased demand for communication capabilities.

For purposes of describing various features of the present invention, switching center 24 will be described as having a plurality of input fiber optic cables 22 designated as 22a, 22b, 22c through 22n and a plurality of output fiber optic cables 23a designated as 23a, 23b, 23c through 23n. Switching center 24 may have multiple optical switch assemblies 40. Optical switch assemblies 40 cooperate with each other to allow switching of a selected optical signal from one fiber optic cable 22 to a selected fiber optic cable 23. Each optical switch assembly 40 may include multiple optical attenuators and multiple optical taps formed as integral components thereof in accordance with teachings of the present invention. Alternatively, switching center 24 may include separate optical switches and separate optical attenuators and taps incorporating teachings of the present invention.

Each fiber optic cable 22 may be coupled with switching center 24 through a respective amplifier 26 and dense wavelength division (DWD) demultiplexer 28. Backplane 30 is preferably provided to optically couple DWD demultiplexers 28 with optical switch assemblies 40. Each optical switch assembly 40 may include multiple dynamic variable optical attenuators and multiple dynamic variable optical taps incorporating teachings of the present invention. Backplane 32 is preferably provided to optically couple optical switch assemblies 40 with multiplexers 36 and respective amplifiers 38. Each dense wavelength division multiplexer 36 and associated amplifier 38 will direct selected optical signals to fiber optic cables 23.

In a typical wavelength division multiplexing system, the power level of each signal transmitted from a respective input fiber optic cable 22 to a respective output fiber optic cable 23 may vary significantly. The respective power levels or signal levels of optical signals communicated from optical switch assemblies 40 to backplane 32 are preferably adjusted to avoid communication problems associated with multiple signals at different power levels. Thus, one or more dynamic variable optical attenuators incorporating teachings of the present invention may be provided to reduce or adjust the signal level of the optical signals to within a desired range.

Dynamic variable optical attenuators formed in accordance with teachings of the present invention may be used to reduce or adjust the signal level of the optical signals prior to entering backplane 32. Alternatively dynamic variable optical attenuators incorporating teachings of the present invention may be used to reduce or adjust the signal level of the optical signals after they exit from backplane 32. One of the technical benefits of the present invention includes the ability to incorporate a dynamic variable optical attenuator and/or tap as an integral component of other optical devices associated with switching center 24 or to form the dynamic, variable optical attenuators and/or taps as separate individual components associated with switching center 24.

Figure 2:
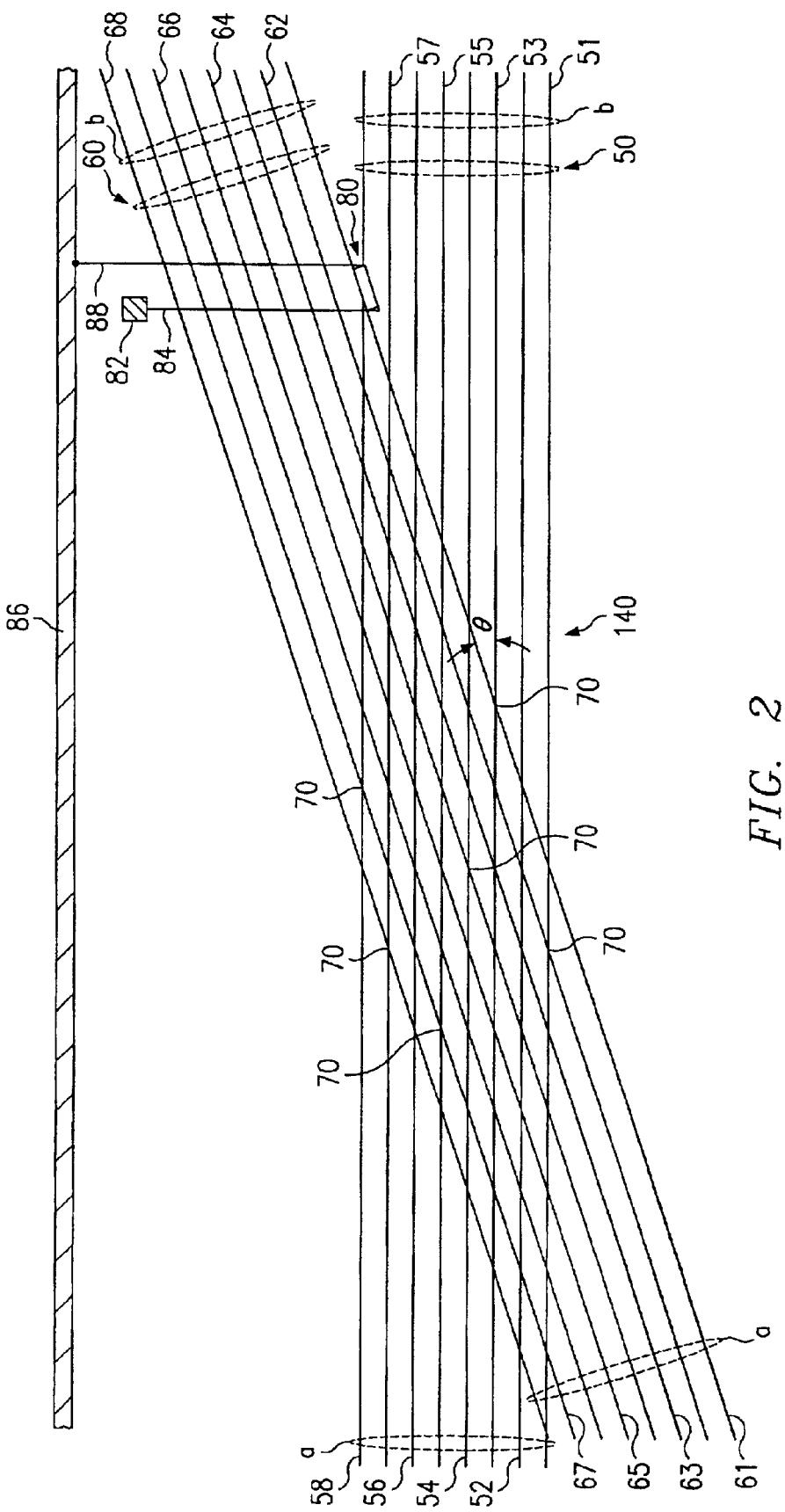
FIG. 2 is a schematic drawing showing a plan view with portions broken away of an 8×8 waveguide array formed in accordance with teachings of the present invention.

FIG. 2 is a schematic drawing showing a plan view of one example of an optical device incorporating teachings of the present invention. Optical device 140 may be used as an optical tap or as an optical splitter. Optical device 140 may also be used to form at least a portion of an optical attenuator. An optical tap, optical splitter, or optical attenuator may have dynamic, variable characteristics. For some applications, optical device 140 as shown in FIG. 2 may also be used to form at least a portion of an optical switch. Optical switch assemblies 40 may include multiple optical devices 140 which function as optical switches, optical attenuators and optical taps.

Optical device 140 preferably includes a first set or array of waveguides 50 and a second set or array of waveguides 60. For purposes of defining various features of the present invention the first array of waveguides 50 are numbered 51 through 58 and the second array 60 are numbered 61 through 68. Each set or array of waveguides 50 and 60 includes respective input ends "a" and output ends "b".

Various features of the present invention will be described with respect to optical signals or light signals (not expressly shown) traveling from input end (a) of waveguides 51–58 to the respective output end (b) of waveguides 51-a and/or 61–68. When optical device 140 functions as an optical attenuator or an optical tap, optical signals or light signals will generally only be supplied to input ends "a" of one of the waveguide arrays (51–58 or 61–68). When optical device 140 is used to function as an optical switch, optical signals will often be communicated with input ends "a" of both waveguides 51–58 and 61–68.

Figure 3:
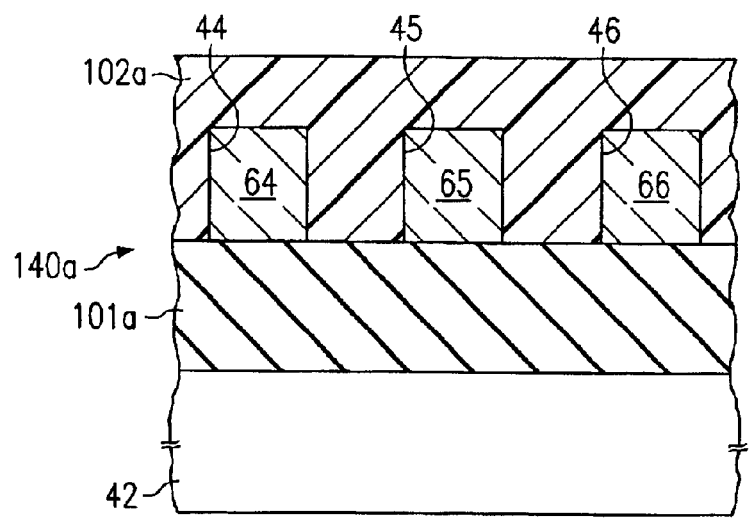
FIG. 3 is a schematic drawing in section with portions broken away taken showing one example of waveguides formed on a substrate in accordance with the teachings of the present invention.
Figure 4:
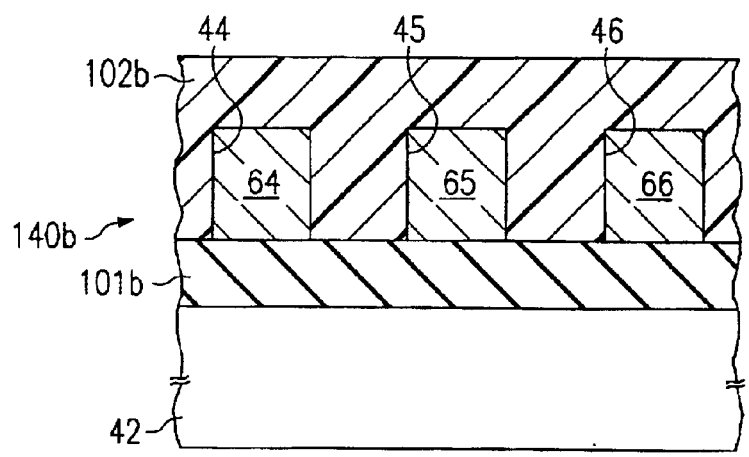
FIG. 4 is a schematic drawing in section with portions broken away taken showing another example of waveguides formed on a substrate in accordance with the teachings of the present invention.
Figure 5:
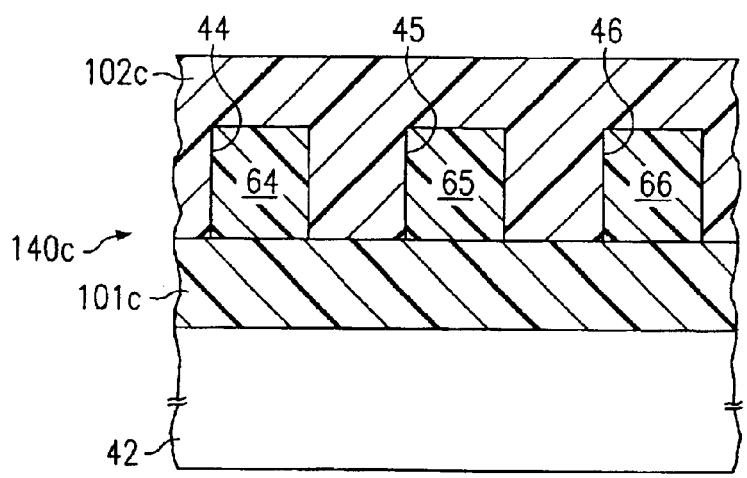
FIG. 5 is a schematic drawing in section with portions broken away taken showing still another example of waveguides formed on a substrate in accordance with teachings of the present invention.

Waveguides 51 through 58 are preferably formed generally parallel with each other on substrate 42. Waveguides 61 through 68 are also formed generally parallel with each other on substrate 42. For some applications, first set of waveguides 50 and second set of waveguides 60 preferably intersect with each other at a selected angle θ. Examples of waveguides 50 and 60 may be formed on substrate 42 are shown in FIGS. 3, 4, and 5.

The angle θ defined by each intersection between the waveguides of first array 50 and second array 60 is preferably selected to be between approximately two degrees (2°) and eight degrees (8°) depending upon the microstructure of the material used to form the waveguides and the associated index of refraction. For one application angle θ may be approximately three degrees (3°). For other applications angle θ is preferably approximately six degrees (6°). By forming optical device 140 with an angle θ having a value between approximately two degrees to eight degrees, an optical signal may travel through respective waveguides 51 through 58 and 61 through 68 without any significant perturbation or reflection at the intersection or junction of the waveguides unless the index of refraction at the junction is changed by heating. For other applications the index of refraction at the junction may be change by electrooptic, magnetooptic or acoustooptic effects.

Respective electrode heaters 80 are preferably disposed adjacent to each intersection 70 of the first array of waveguides 50 with the second array of waveguides 60. Electrode heaters 80 may be formed from various types of materials including nickel chrome alloys (NiCr), chromium gold (Cr/Au) and other metals and alloys. For purpose of illustration only one electrode heater 80 is shown in FIG. 2. Since first array 50 and second array 60 each have eight individual waveguides, optical device 140 has a total of sixty-four (64) intersections or junctions 70 between waveguides 51–58 and waveguides 61–68. Therefore, optical device 140 will preferably have sixty-four (64) electrode heaters 80. Each electrode heater 80 may apply heat to its associated junction 70 to direct or deflect optical signals from an associated waveguide in first array 50 to an associated waveguide in second array 60.

A portion of each optical signal travelling from respective input end "a" of waveguides 51 through 58 may be directed to a respective waveguide in second array 60 using the appropriate electrode heater 80. Electrical current may be provided from an appropriate source such as current source 82 formed on substrate 42. For the embodiment of the present invention as shown in FIG. 2, electrical current may flow from source 82 through lead 84, electrode 80 and return to ground 86 through lead 88. Current source 82, leads 84 and 88, and ground 86 may be formed on substrate 42 using conventional semiconductor fabrication techniques.

As previously noted optical device 140 may be used as an optical tap. For example, electrical current may be provided to associated electrode heater 80 to direct a portion of an optical signal traveling through waveguide 58 to waveguide 61. Varying the amount of electrical current supplied to electrode heater 80 may be used to adjust the percentage of the optical signal which is directed to or "tapped by" optical waveguide 61. For some applications the signal level or power level removed from or "tapped by" waveguide 61 may be one-tenth of one percent (0.1%) or less. For other applications as much as ten percent (10%) of the signal level or power level may be removed or "tapped by" waveguide 61. Optical signal level or power level which is "tapped by" waveguide 61 will often depend upon the sensitivity of the associated detector and the total power level of the optical signal communicated through waveguide 58.

Optical device 140 may also be referred to as a "variable tap" or "variable splitter.". For example, by changing the amount of electrical current supplied to electrode heater 80, the amount or percentage of an optical signal directed from waveguide 58 to waveguide 61 may be varied. Optical device 140 may also be referred to as a "variable tap" because electrical current may be supplied to one or more electrode heaters 80 to tap or remove portions of an optical signal through waveguide 58 and direct the tapped portion to one or more waveguides 61–68.

Optical device 140 may be used as an optical tap or optical splitter which can be varied by both the percentage of an optical signal which is split or tapped from a waveguide and varied as to which waveguides 61–68 receive the split or tapped signal. When certain types of information are communicated through waveguide 58 a tap may be provided with waveguide 61. For other types of information communicated through waveguide 58 a tap may be provided with only waveguide 68. Therefore, optical device 140 allows varying both the signal level or power level which is removed from or tapped from a waveguide in the first array and also allows varying which waveguide or waveguides in the second array receives the split or tapped signal.

As previously noted, optical device 140 may also be used as an optical attenuator. For example, electrical current may be provided to one or more electrode heaters 80 to direct portions of an optical signal traveling through waveguide 58 to one or more waveguides 61–68. Varying the amount of electrical current supplied to each electrode heater 80 and varying the number of electrode heaters 80 may be used to adjust the percentage of the optical signal traveling through waveguide 58 which is reduced or "attenuated" by directing portions of the optical signal to one or more waveguides 61–68. As discussed later in more detail, various control systems and/or monitoring systems may be provided such that both the amount of electrical currents supplied to electrode heaters 80 may be used to adjust the optical signal level such that the power level of respective optical signals exiting from output end 50B of waveguides 51–58 are approximately equal with each other.

Optical device 140 may also be referred to as a "variable attenuator". For example, by changing the amount of electrical currents applied to each electrode heater 80, the amount or percentage of an optical signal which is attenuated within waveguides 51–58 may be varied. Optical device 140 may also be used to provide "a dynamic variable tap" or a "dynamic variable optical attenuator" because the signal level of the tapped signal may be varied while the associated communication system is operating and/or the amount of attenuation of an optical signal may be varied while the associated communication system is operating.

FIGS. 3, 4, and 5 show various examples of waveguides which may be formed on a substrate using semiconductor fabrication techniques to produce an optical device 140 incorporating teachings of the present invention. For the embodiments shown in FIGS. 3, 4, and 5, substrate 42 may be part of a typical silicon wafer used in semiconductor fabrication. However, an optical device may be formed in accordance with teachings of the present invention on a wide variety of substrates and is not limited to use with only conventional silicon substrates.

Waveguides 51–58 and 61–68 of optical device 140 are preferably disposed in respective channels formed in a layer of top cladding. Waveguides 51–58 and 61–68 may be formed from a wide variety of materials including polymers, polyimide, amorphous fluoropolymers such as Teflon® AF, a mixture of silicon dioxide and polymeric materials, ion exchange and polymer and fluorinated polyimide, perfluorocyclobutane (PFCB), bisbenzocyclobutene (CBC) and fluorinated cyclobutane compounds. Many of these materials are available from Dow Chemical Company. For some applications a benzocyclobutene based polymer dielectrics such as CYCLOTENE™ Resins from The Dow Chemical Company may be used. CYCLOTENE™ Resins are high-purity polymer solutions that have been developed for microelectronics applications. The resins are derived from B-staged bisbenzocyclobutene (BCB) monomers and are formulated as high-solids, low-viscosity solutions.

Teflon is a registered trademark of E. I. DuPont de Nemours and Company. Teflon AF, Teflon AF 1600, Teflon AF 2200 and Teflon AF 2400 are available from DuPont and other companies. For example, the top layer may be formed from Ultradel U 9120 polyimide having a refraction index of 1.5397 and a core of Ultradel U 9020 polyimide having a refraction index of 1.526. Ultradel is a trade name associated with polyimide materials available from BP Amoco.

For some applications, the spacing between these channels may be approximately eighty micrometers (80 mm). For other applications, the spacing between channels may be approximately one hundred twenty five micrometers (125 mm). The portions of the embodiments of the present invention shown in FIGS. 3, 4, and 5 include three channels designated 44, 45 and 46. Each channel 44, 45 and 46 preferably has a generally rectangular cross section with dimensions in the range of approximately six or seven micrometers (6 or 7 mm). Various features of the present invention will be described with respect to optical devices 140a, 140b and 140c as shown respectively in FIGS. 3, 4 and 5.

Optical device 140a as shown in FIG. 3 preferably includes a layer 101a of silicon dioxide ($SiO_2$) disposed immediately adjacent to substrate 42. For some applications, layer 101a may have a thickness of approximately fifteen micrometers (15 mm) with an index of refraction of approximately 1.445. Waveguides 64, 65 and 66 may be formed on layer 101a from a combination of silicon dioxide and germanium oxide ($SiO_2:GeO_2$) with an index of refraction of approximately 1.4538. Second layer 102a is preferably formed on first layer 101a and waveguides 64, 65 and 66 to provide channels 44, 45 and 46. Layer 102a may also be referred to as "top cladding". Respective waveguides 64, 65 and 66 are thus disposed in respective channels 44, 45 and 46. For the embodiment of the present invention as shown in FIG. 4a, layer 102a may be formed from Teflon AF 1600 having an index of refraction of approximately 1.31. The thermal optic coefficient of many polymers is generally less than zero. As a result, when the temperature of such polymers is increased, the corresponding index of refraction is reduced. Teflon AF 1600 represents one example of a polymer having the desired thermal optic coefficient.

Optical device 140b as shown in FIG. 4 preferably includes first layer 101b formed from silicon dioxide having a thickness of approximately 2.4 micrometers (2.4 mm). Second layer or top cladding 102b may be formed from polymeric material such as Ultradel 9021 having an index of refraction of approximately 1.526. For the embodiment of the present invention as represented by optical switch 40b, waveguides 64, 65 and 66 may be formed from Ultradel 9120 having an index of refraction of approximately 1.5397.

Optical device 140c as shown in FIG. 5 preferably includes first layer 101c formed from Teflon AF 240 having an index of refraction of approximately 1.29. Second layer or top cladding 102c may be formed from Teflon AF 240 having an index of refraction of 1.29. The thickness of first layer 101c may be approximately five micrometers (5 mm). Waveguides 64, 65 and 66 may be formed from Teflon AF 160 having an index of refraction of approximately 1.31.

Figure 6:
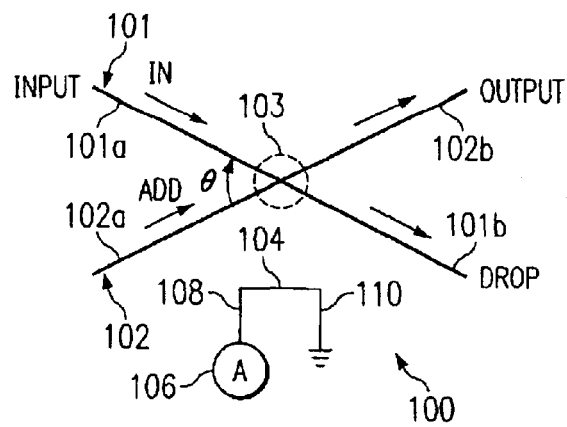
FIG. 6 is a schematic drawing with portions broken away showing portions of two waveguides and an electrode heater which may be used to form an optical attenuator or an optical tap in accordance with teachings of the present invention.

FIG. 6 is a schematic drawing showing a plan view of one example of optical device 100 incorporating teachings of the present invention. Optical device 100 may be used as an optical signal tap or as part of an optical signal attenuator. Optical device 100 preferably includes first waveguide 101 and second waveguide 102. Each waveguide 101 and 102 also includes respective input ends "a" and output ends "b". Although various features of the present invention will be described with respect to an optical signal traveling from input end "a" to output end "b" of a waveguide, an optical device formed in accordance with teachings of the present invention may be satisfactorily used to switch or redirect optical signals traveling in either direction through the waveguide. Also, Various features of the present invention will be described with respect to tapping or attenuating an optical signal which is traveling through first waveguide 101. However, optical device 100 may also be satisfactorily used to tap or attenuate an optical signal traveling through second waveguide 102.

Input end 101a of optical device 100 may be coupled with a respective fiber optic cable. Output end 101b of optical device 100 may be is preferably coupled with another fiber optic cable or waveguide. When used as an optical signal tap or optical signal attenuator, input end 102a of optical device 100 is generally capped or not connect with a source of optical signals. Output end 102b of each optical device 100 may be coupled with an output port and another fiber optic cable or waveguide.

When used as an optical signal tap or optical signal attenuator, optical signals will normally travel from input end 101a through first waveguide 101 to output end 101b. A portion of each optical signal may be direct by optical device 100 to travel through second waveguide 102 to an output port (not expressly shown) coupled with output end 102b. Except for insertion losses and other minor losses associated with an optical signal traveling through a waveguide, the optical power level of an optical signal entering input end 10a is approximately equal to the total optical power level exiting from output end 101b plus output end 102b. Except for insertion losses and other minor losses associated with transmission of an optical signal through a waveguide, the total optical energy level or power level of optical signals communicated through optical device 100 remains substantially constant.

Angle θ defined by intersection or junction 103 between first waveguide 101 and second waveguide 102 is preferably selected to be in the range of approximately two degrees (2°) and eight degrees (8°). For at least one application angle θ may be equal to approximately three degrees (3°). For other applications, angle θ is preferably approximately six degrees (6°). By forming optical device 100 with angle θ having a value between approximately two degrees (2°) and eight degrees (8°), an optical signal may travel through first waveguide 101 from input end 101a to output end 101b without any significant perturbation or reflection at intersection or junction 103 unless the index of refraction at junction 103 is changed in accordance with teachings of the present invention. The index of refraction at junction 103 may be changed by thermooptic, electrooptic, magnetooptic, or acoustooptic effects.

Electrode heater 104 is preferably disposed adjacent to junction or intersection 103 to produce desired thermooptic effects. Electrode heater 104, see FIGS. 6, 7 and 8, may be formed from various types of materials including nickel chrome alloys (NiCr) and chromium gold (Cr/Au). Electrode heater 104 may be used to apply a desired amount of heat to junction or intersection 103 to direct or deflect optical signals from first waveguide 101 to second waveguide 102. This function of optical device 100 may be used to tap optical signals traveling through waveguide 101 and/or to attenuate such optical signals.

Figure 8:
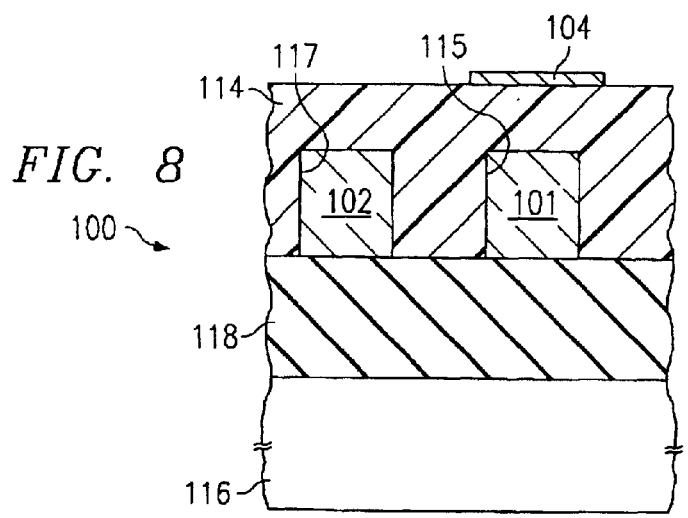
FIG. 8 is a schematic drawing in section showing portions of the optical device of FIG. 7.

When electrical current is supplied to electrode heater 104, heating will occur in cladding layer 114 disposed between electrode heater 104 and junction 103, see also FIG. 8, to produce a desired thermooptic effect such as tapping and/or attenuation of an optical signal. For example, an optical signal may be directed to input end 101a of waveguide 101. An appropriate amount of electrical current may be supplied to electrode heater 104 to provide a desired amount of heating at intersection or junction 103 to direct (tap) a portion of the optical signal from waveguide 101 to waveguide 102 and output end 102b. Tapping and an attenuation of optical signals will be discussed in more detail with respect to the graphs shown in FIGS. 9 and 10.

The configuration and location of electrode heater 104 allows selected heating of portions of waveguides 101 and 102 to form what may be considered as an imaginary, variable mirror disposed along a longitudinal center line of intersection 103. Heating cladding layer 114 and portions of waveguides 101 and 102 at intersection 103 will permit a change in the refractive index such that selected amounts of internal refraction may be achieved. In effect, heating by electrode heater 104 will reflect or deflect at least a portion of light signals from waveguide 101 to waveguide 102.

Figure 7:
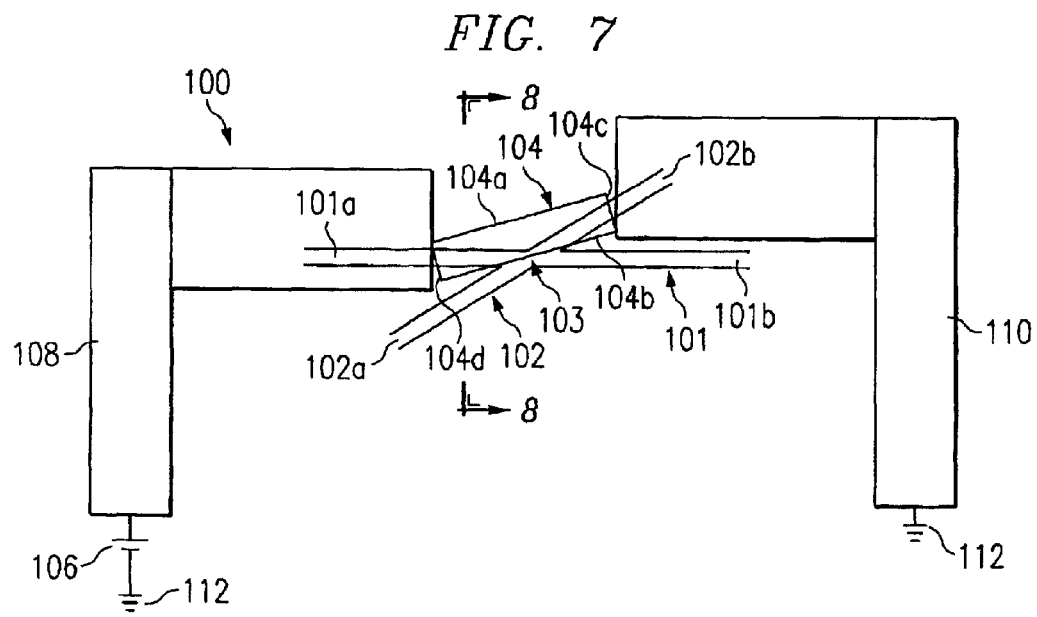
FIG. 7 is a more detailed drawing showing a plan view with portions broken away of the two waveguides and electrode heater of FIG. 6.

For the embodiment of the present invention shown in FIGS. 6 and 7, current may flow from variable current source 106 through lead 108 to electrode heater 104 and return through electrical lead 110 to ground 112. The current flow through electrode heater 104 may be varied in accordance with teachings of the present invention to allow switch 100 to function as a variable optical attenuator. Waveguides 101 and 102, electrode heater 104, current source 106, electrical leads 108 and 110 and ground 112 may be formed on a substrate using conventional semiconductor fabrication techniques.

FIG. 7 is a schematic drawing showing additional details associated with one embodiment of optical device 100. For example, low resistance electrical leads 108 and 110 are shown in more detail. For the embodiment of the present invention as shown in FIG. 7, electrode heater 104 has a generally rectangular configuration defined in part by a pair of longitudinal edges 104a and 104b and a pair of lateral edges 104c and 104d. Longitudinal edges 104a and 104b may have a length of approximately two hundred fifty micrometers (250 μm). Lateral edges 104c and 104d may have a length of approximately ten micrometers (10 μm). The thickness of electrode heater 104 is preferably very small, almost zero, as compared with the thickness of first waveguide 101 and second waveguide 102.

As shown in FIG. 8, a layer of cladding 114 is preferably disposed between first waveguide 101 and second waveguide 102 and junction or intersection 103. Longitudinal edge 104b of electrode heater 104 is preferably disposed on a line that corresponds generally with the longitudinal center line of junction or intersection 103 between first waveguide 101 and second waveguide 102. For some applications, the vertical spacing or distance between electrode heater 104 and the corresponding junction or intersection 103 is approximately five micrometers (5 μm) within a range of plus or minus 0.5 μm. The lateral offset between longitudinal edge 104b of electrode heater 104 and the corresponding longitudinal center line of intersection 103 is preferably less than 9.5 μm. When the offset between electrode heater 104 and the respective intersection 103 exceeds these limits, desired heating of intersection or junction 103 and resulting internal reflection of an optical signal traveling therethrough may not occur as desired.

For the embodiment of the present invention shown in FIG. 8, optical device 100 preferably includes layer 118 disposed immediately adjacent to substrate 116. Layer 118 may be formed from various types of material such as silicon dioxide ($SiO_2$), or other materials such as Teflon AF 240. First waveguide 101 and second waveguide 102 may be formed from various types of material such as a combination of silicon dioxide and germanium oxide (SiO2:GeO2) with an index of refraction of approximately 1.4538. For some applications, layer 118 may have a thickness of approximately fifteen micrometers (15 μm) with an index of refraction of approximately 1.445.

Waveguides 101 and 102 may be formed on layer 118 and disposed in respective channels 115 and 117 formed in cladding layer 114. For one embodiment channels 115 and 117 preferably have a generally rectangular cross section with dimensions in the range of approximately of six or seven micrometers (6 or 7 μm). Layer 114 may sometimes be referred to as "top cladding". Layer 114 may be formed from Teflon AF 1600 having an index of refraction of approximately 1.31. The thermooptic coefficient of many polymers is generally less than zero. As a result, when the temperature of such polymers is increased, the corresponding index of refraction is reduced. Teflon AF 1600 represents one example of a polymer having the desired thermooptic coefficient. Perfluorocyclobutane (PFCB) is another example of a polymer having the desired thermoptic coefficient.

For other applications first layer 118 may be formed from silicon dioxide having a thickness of approximately 2.4 micrometers (2.4 μm). Second layer or top cladding 114 may be formed from polymeric material such as Ultradel 9021 having an index of refraction of approximately 1.526. Waveguides 101 and 102 may be formed from Ultradel 9120 having an index of refraction of approximately 1.5397.

For still other applications first layer 118 may be formed from Teflon AF 240 having an index of refraction of approximately 1.29. Second layer or top cladding 114 may be formed from Teflon AF 240 having an index of refraction of 1.29. The thickness of first layer 118 may be approximately five micrometers (5 μm). Waveguides 101 and 102 may be formed from Teflon AF 160 having an index of refraction of approximately 1.31.

Waveguides 101 and 102 may be formed from a wide variety of materials including polyimide, Teflon, a mixture of silicon dioxide and polymer, ion exchange and polymer and fluorinated polyimide. Layer 114 may be formed from Ultradel polymer U 9120 having a refraction index of 1.5397 and waveguides 101 and 102 of Ultradel U 9020 having a refraction index of 1.526.

Figure 9:
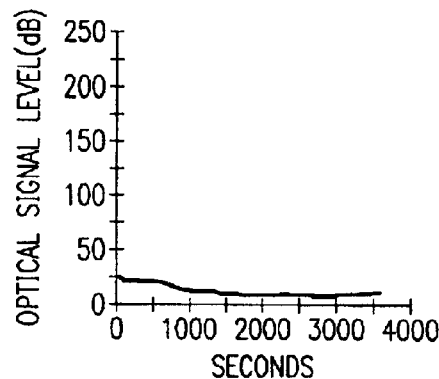
FIG. 9 is a graph showing optical output or signal level versus time at an output port of a dynamic variable optical attenuator or a dynamic variable optical tap formed in accordance with teachings of the present invention for a current flow through an associated electrode heater.

FIG. 9 is a graph showing optical signal level versus time for a given current flow through electrode heater 104. For one example of optical device 100, optical signal level was measured at output end 101b of first guide 101 versus time in seconds at a substantially constant current flow through electrode heater 104. The current supplied to electrode heater 104 was maintained at approximately forty milliamps for thirty six hundred (3600) seconds or sixty (60) minutes.

Figure 10:
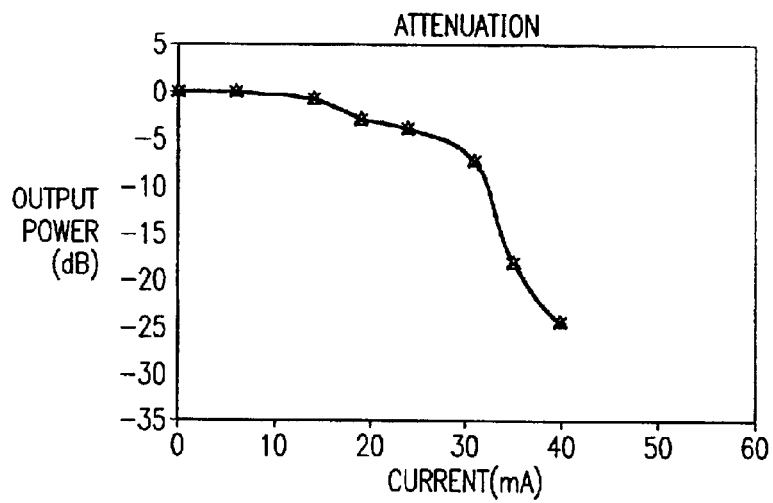
FIG. 10 is another graph showing attenuation of an optical signal at an output port of a dynamic variable optical attenuator or a dynamic variable optical tap formed in accordance with teachings of the present invention.

FIG. 10 is a graph showing output power or signal level in decibels (dB) measured at output end 101b of waveguide 101 versus electrical current flow through electrode heater 104. An optical signal with constant power or signal level was supplied to input end 101a of waveguide 101 while electric current flow to electrode heater 104 was varied in accordance with teachings of the present invention. As previously noted, the power level or signal level of an optical signal entering input end 101a of waveguide 101 is generally equal to the combined power level or signal level of optical signals exiting from output end 102b of waveguide 102 and output end 101b of waveguide 101. Therefore, a similar measurement of output power or signal level measured at output end 102b of waveguide 102 would be approximately the inverse of the graph shown in FIG. 10.

The graphical information shown in FIG. 10 demonstrates that increasing current flow through electrode heater 104 of optical device 100 may be used to attenuate or decrease the output power or signal level of an optical signal traveling between input end 101a and output end 101b of waveguide 101. In the same manner, the output power or signal level of the portion of the optical signal directed to output end 102b of waveguide 102 may be selectively increased or decreased. Attenuation of an optical signal at output end 101b or increase in optical signal at output end 102b is particularly significant between approximately twenty-two milliamps and forty milliamps.

Figure 11:
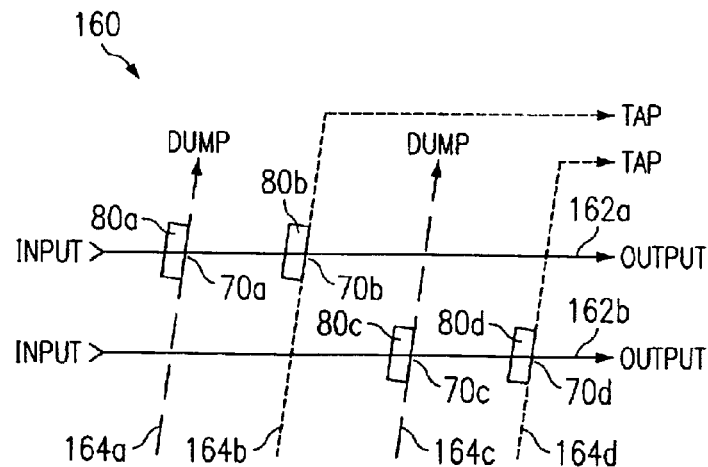
FIG. 11 is a schematic drawing with portions broken away showing one example of a dynamic variable optical attenuator formed in accordance with teachings of the present invention.

FIG. 11 is a schematic drawing which shows a portion of optical attenuator 160 formed in accordance with teachings of the present invention. Dynamic, variable optical attenuator 160 may include multiple waveguides 162 with optical signals traveling therethrough. For purposes of describing various features of the present invention the waveguides are designated as 162a and 162b. Additional waveguides 164 preferable intersect with and form respective junctions 70. For purposes of describing various features of the present invention waveguides 164, as shown in FIG. 11 have been designated 164a, 164b, 164c and 164d. The associated electrode heaters 80 and junctions 70 have similar designations of "a,b,c, and d".

During operation of dynamic, variable optical attenuator 160, waveguide 164b and electrode heater 80b preferably cooperate with each other to remove or tap a selected portion of the optical signal traveling through waveguide 162a. The output portion of waveguide 164b may be optically coupled with an appropriate detector or monitor (not expressly shown) to determine various characteristics associated with the optical signal or signals traveling through waveguide 162a. If the intensity or signal level within waveguide 162a exceeds a desired value, an appropriate amount of electrical current may be provided to electrode 80a such that a portion of the optical signal traveling through waveguide 162a will be directed to waveguide 164a and dumped.

Waveguide 164d and associated electrode 80d provide a similar capability to tap or monitor optical signals communicated through waveguide 162b. When the intensity or power level of such signals exceeds a pre-selected value, electrical current may be supplied to electrode heater 80c to direct a portion of the optical signal traveling through waveguide 162b to waveguide 164c. Thus, variable optical attenuator 160 may be used to maintain substantially the same power level with respect to optical signals traveling through waveguides 162a and 162b.

Figure 12:
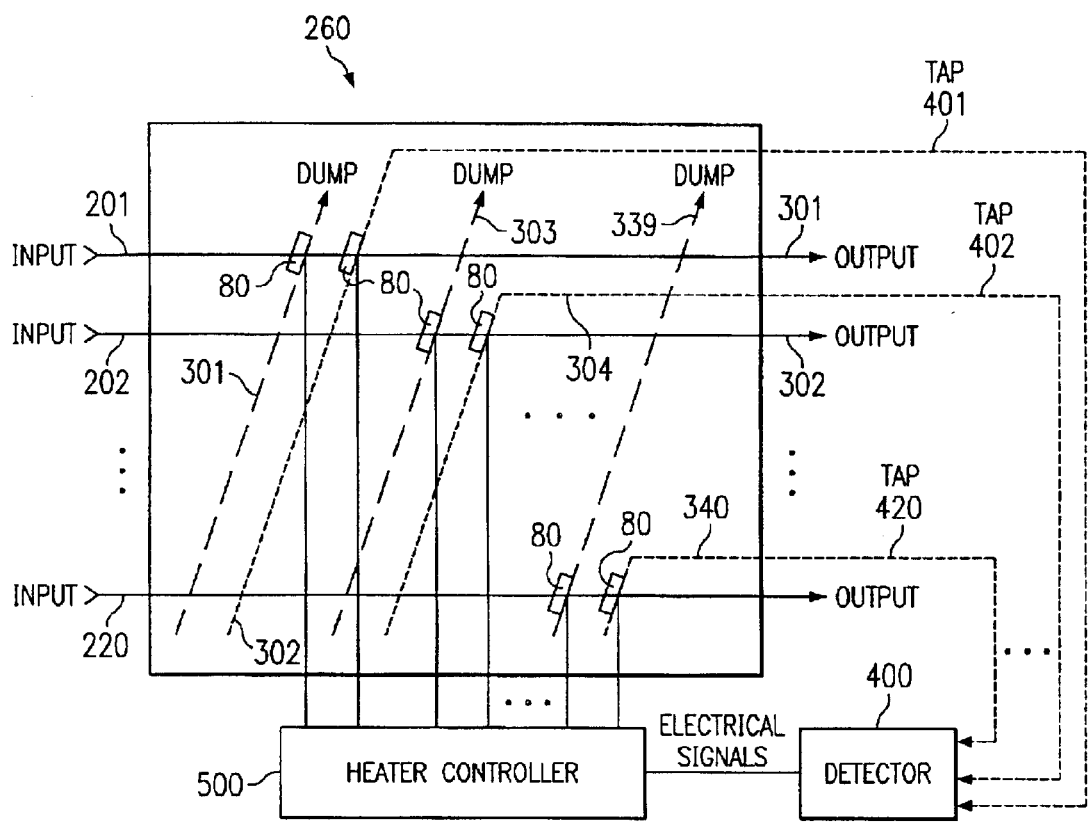
FIG. 12 is a schematic drawing in section with portions broken away showing another example of a dynamic variable optical attenuator formed in accordance with teachings of the present invention.

Dynamic, variable optical attenuator 60 incorporating teachings of the present invention is shown in FIG. 12. The various components associated with Dynamic, variable optical attenuator 260 may be formed on a semiconductor substrate as previously described with respect to optical devices 100 and 140. For the embodiment of the present invention as shown in FIG. 12 dynamic, variable optical attenuator includes 20 waveguides designated 301 through 320. Fiber optic cables and/or other waveguides may be optically coupled with the input end and the output end of each waveguide 201 through 220.

A second array of waveguides designated 301 through 340 may also be disposed on the same substrate to intersect with the first set of waveguides 201–202. Each waveguide 201 through 220 preferable intersects with at least two waveguides of the second set. For example, waveguide 201 preferably intersects with at least waveguide 301 and 302. Respective electrode heaters 80 are preferably disposed on the intersection or junction between waveguide 201 and waveguides 301 and 302. For some applications all of the waveguides in the first set or array (201–220) will intersect with each of the waveguides in the second array or second set (301–340). In a manner similar to optical device 140. For the embodiment of the present invention as shown in FIG. 12 dynamic variable optical attenuator 260 may be described as a 20×40 array.

Waveguide 302 and its associated electrode heater 30 may function as a tap to monitor optical signals traveling through waveguide 201. Waveguide 302 may be connected with optical detector 400 by fiber optic cable or other suitable waveguide 401. In a similar manner waveguide 402 may be used to optically couple waveguide 304 with detector 400.

Detector 400 may be used to measure various characteristics of the optical signals traveling through the respective waveguides 201–220. One of these characteristics may be signal level or power level of the associated optical signal. Electrical signals corresponding with these characteristics may then be transmitted to heater controller 500. Based on the information collected by detector 400, heater controller 500 may vary the electric current flow directed to each electrode heater 80 to vary the amount of the optical signal which is tapped by waveguide 302. Also, heater controller 400 may vary the electrical signal provided to the respective electrode heater 80 to vary the portion of the optical signal which may be dumped from waveguide 201 by waveguide 301. Detector 400 and heater controller 500 may perform the same functions for the respective tap and attenuator associated with each waveguide 201–220. Thus variable dynamic attenuator 260 may vary the attenuation and also the tapping of optical signals communicated through waveguides 201–220 while the associated communication system or network remains in operation.

Figure 13:
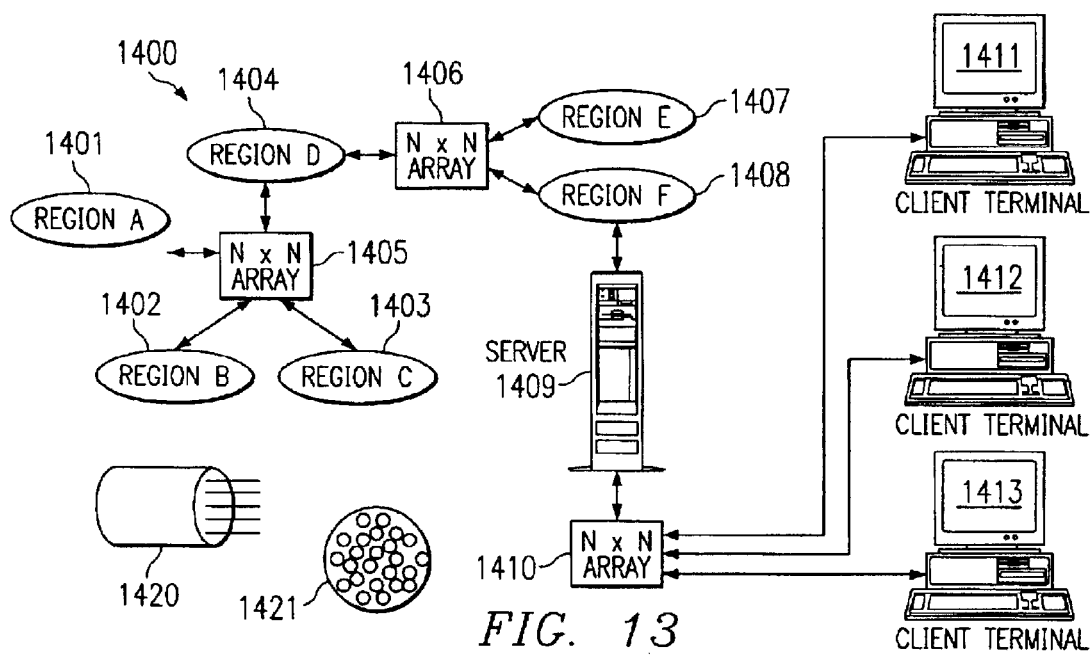
FIG. 13 is a schematic drawing showing another embodiment of an optical communication system which includes multiple dynamic variable optical attenuators and/or dynamic variable optical taps formed in accordance with teachings of the present invention.

FIG. 13 illustrates an optical communication system which may include variable optical attenuators and optical taps formed in accordance with the teachings of the present invention. The system, illustrated generally at 1400, includes a plurality of regions operable to communicate information via a fiber optic network. Network 1400 includes a region A 1401, region B 1402, region C 1403, and region D 1404 optically coupled to an N×N array 1405. Region D is further coupled to region E 1407, and region F 1408 via N×N array 1406. Server 1409 is coupled to region F 1408 and N×N array 1410. N×N array 1410 is also coupled to first client terminal 1411, second client terminal 1412, and third client terminal 1413.

Fiber optic cable 1420 having a plurality of fiber optic waveguides 1421 may be coupled between regions via an N×N array. For example, region A 1401 may be coupled to N×N array 1405 via a fiber optic cable having 10,000 channels or fiber optic waveguides. Additionally, region 1404 may be coupled to N×N array 1405 via a fiber optic cable having 1,000 channels or fiber optic waveguides.

Network 1400 advantageously provides for high capacity fiber optic utilization operable to communicate optical signals at high transmission capacities. In one embodiment, communication between each region may be observed as a "long haul" communication, a "regional" communication, a "metro" communication, and "user" communication regions. As such, N×N arrays 1405, 1506 and 1410 provide communication between the plurality of regions such that optical signals may be communicated to desirable destinations. For example, N×N array 1405 may include optical outputs and optical inputs between region A 1401 and region B 1402. As such, a control circuit may provide a control signal such that an optical signal may be attenuated or taped using optical devices 140.

In another embodiment network 1400 may be operable to communicate or switch optical signals between server 1409 and client terminals 1411, 1412 and 1413. For example, a control circuit (not shown) operably coupled to N×N array of optical device 140 may tap and/or attenuate optical signals communicated between server 1409 client terminals 1411, 1412 and 1413 by providing appropriate electrical currents to heat selected junctions between two waveguides such that an optical signal incident to N×N array 1410 may be tapped between a client terminal and server 1409.

Although the present invention and its advantages have been described in detail, it should be understood that various changes, substitutions and alternations can be made herein without departing from the spirit and scope of the invention as defined by the following claims.

What is claimed is:

1. A communication system having a plurality of dynamic, variable optical attenuators, each optical attenuator comprising:

an intrinsically wide band device covering all S-band, C-band and L-band optical signals formed in party by a first array of waveguides and a second array of waveguides;

each waveguide defined in part by a core respectively disposed in a channel formed in a layer of cladding;

each waveguide formed from material selected to allow optical signals to communicate therethrough;

the waveguides of the first array intersecting with the waveguides of the second array at an angle (θ) to form respective junctions; and a respective electrode heater disposed on the layer of cladding adjacent to each junction for use in heating the junction to attenuate optical signals communicated through waveguides of the first array by directing a selected portion of the optical signals communicated through the waveguides of the first array to selected waveguides of the second array by internal reflection of the optical signals at the respective junctions.

2. An optical tap for selectively removing a portion of an optical signal communicated through a waveguide comprising:

a substrate having a first array of waveguides and a second array of waveguides disposed thereon, each waveguide formed from materials selected to allow optical signals to communicate therethrough;

the waveguides of the first array intersecting the waveguides of the second array at a selected angle (θ), a respective junction formed by each intersection of the waveguides; and a respective electrode heater disposed adjacent to each junction to direct, by internal reflection, the portion of the optical signal from one of the waveguides to the other waveguide.

3. The optical tap of claim 2 further comprising the selected angle (θ) having a value between approximately two degrees and eight degrees depending on microstructure of the junction and associated index of refraction of the waveguides.

4. The optical tap of claim 2 further comprising the selected angle (θ) having a value of approximately three degrees.

5. The optical tap of claim 2 further comprising the selected angle (θ) having a value of approximately six degrees.

6. A variable optical tap for selectively removing a portion of an optical signal communicated through a waveguide comprising:
- a first array of waveguides and a second array of waveguides disposed on a substrate;
- the waveguides of the first array extending substantially parallel with each other and the waveguides of the second array extending substantially parallel with each other;
- the waveguides of the second array intersecting the waveguides of the first array at a selected angle (θ);
- the intersection of the waveguides of the first array and the second array forming a plurality of respective junctions;
- a layer of cladding disposed over the waveguides including the respective junctions;
- the layer of cladding disposed between adjacent waveguides;
- a plurality of electrode heaters respectively disposed on the layer of cladding adjacent to the junctions;
- a source of electrical current coupled with the electrode heaters; and
- each electrode heater operable to selectively heat the respective junction to provide internal reflection which directs the portion of the optical signal from one waveguide of the first array to an associated waveguide of the second array.

7. The optical tap of claim 6 further comprising the selected angle (θ) having a value greater than two degrees.

8. The optical tap of claim 6 further comprising the selected angle (θ) having a value less than eight degrees.

9. The optical tap of claim 6 further comprising the selected angle (θ) having a value of approximately six degrees.

10. A method for selectively tapping a portion of an optical signal communicated through a waveguide comprising:
- communicating the optical signal through a first waveguide, selected from one of an array of first wave guides, formed on a substrate;
- supplying electrical current to an electrode heater disposed adjacent to a junction formed by an intersection between the first waveguide and a second waveguide, selected from one of an array of second waveguides, formed on the substrate, and wherein the waveguides of the first array intersect the waveguides of the second array at a predetermined angle;
- heating the junction with the associated electrode heater to provide internal reflection at the intersection of the waveguides; and
- varying the amount of electrical current supplied to the electrode heater to vary the portion of the optical signal directed from the first waveguide to the second waveguide by the internal reflection.

11. The method of claim 10 further comprising monitoring the optical signal directed to the second waveguide and adjusting the electrical current supplied to the electrode heater based on the optical signal directed to the second waveguide.

12. An optical attenuator for selectively reducing the signal level of an optical signal communicated through a first waveguide comprising:
- at least a second waveguide and a third waveguide intersecting the first waveguide to form respective junctions with the first waveguide, the second waveguide operable to dump a portion of the optical signal communicated through the first wave guide and a fiber optic cable coupling an output of the third wave guide with a detector, the detector operable to determine the signal level of the optical signal communicated through the first waveguide;
- each waveguide formed from materials selected to allow optical signals to communicate therethrough;
- the first waveguide having an input and an output;
- a respective electrode heater disposed adjacent to each junction;
- the electrode heaters operable to heat the respective junction to produce internal reflection which direct a portion of the optical signal in the first waveguide to the second waveguide and another portion of the optical signal in the first waveguide to the second waveguide; and
- a heater controller operable to supply an electrical current to at least one electrode heater to selectively adjust the signal level of the optical signal at the output of the first waveguide, the heater controller operable to receive a signal from the detector corresponding with the signal level of the optical signal communicated through the first waveguide and to vary the electrical current supplied to the electrode heater associated with the second waveguide.

13. The optical attenuator of claim 12 further comprising:
- an array of first waveguides disposed on a substrate;
- an array of second waveguides and third waveguides disposed on the substrate; and
- the second waveguides and the third waveguides intersecting the first waveguides at the selected angle (θ).

14. An optical attenuator for selectively reducing the signal level of an optical signal communicated through a first waveguide comprising:
- at least a second waveguide and a third waveguide intersecting the first waveguide to form respective junctions with the first waveguide;
- each waveguide formed from materials selected to provide an intrinsically wide band device covering all S-band, C-band and L-band optical signals;
- the first waveguide having an input and an output;
- a respective electrode heater disposed adjacent to each junction;
- the electrode heaters operable to heat the respective junction to produce internal reflection which direct a portion of the optical signal in the first waveguide to the second waveguide and another portion of the optical signal in the first waveguide to the second waveguide; and
- a heater controller operable to supply an electrical current to at least one electrode heater to selectively adjust the signal level of the optical signal at the output of the first waveguide.

15. A method of forming a dynamic, variable optical attenuator operable to attenuate respective optical signals communicated through a first array of waveguides comprising:
- forming a first array of waveguides and a second array of waveguides disposed on a substrate with the waveguides of the first array intersecting the waveguides of the second array at a selected angle (θ) to form respective junctions;
- forming a layer of cladding over the waveguides and the respective junctions; and forming the waveguides and the cladding at least in part from materials selected from the group consisting of polymers and other combinations of monomers which produce internal reflection at the respective junctions in response to thermal optic, electrooptic, magnetooptic or acoustooptic effects.

16. The method of claim 13 further comprising:

coupling an optical signal detector with selected waveguides in the second waveguides;

placing electrode heaters adjacent to each junction to heat the associated waveguides to produce the internal reflection; and coupling the electrode heaters with a heater controller operable to supply a respective electrical current to each electrode heater.

17. The method of claim 15 further comprising coupling at least one of the waveguides of the second array with a detector to monitor the signal level of an optical signal communicated through at least one of the waveguides of the first array.

18. The method of claim 15 further comprising:

placing an electrode heater adjacent to each junction to heat the associated waveguides to produce the internal reflection;

coupling selected waveguides of the second array with a detector to monitor the signal level of optical signals communicated through the first array;

coupling a heater controlled with the electrode heaters to supply electrical current to the electrode heaters; and coupling the detector to the heater controller to allow the detector to send a signal to the heater controller to adjust the electrical current supplied to at least one of the electrode heaters.

19. The method of claim 15 further comprising:

placing an electrode heater adjacent to each junction to heat the associated waveguides to produce the internal reflection;

coupling at least a first waveguide of the second array with a detector to tap and monitor the signal level of an optical signal communicated through at least one of the waveguides of the first array;

coupling the electrode heater associated with a junction between the first waveguide of the second array and the at least one waveguide of the first array with a heater controller; and coupling the electrode heater associated with a junction between a second waveguide of the first array with the heater controller.

* * * * *

UNITED STATES PATENT AND TRADEMARK OFFICE
CERTIFICATE OF CORRECTION

PATENT NO.      : 6,778,736 B2
APPLICATION NO. : 10/098050
DATED           : August 17, 2004
INVENTOR(S)     : Marwardt et al.

It is certified that error appears in the above-identified patent and that said Letters Patent is hereby corrected as shown below:

Title Page, References Cited,
Item (56), under "OTHER PUBLICATIONS", line 5, after "Annex to Form PCT/ISA/206-" change "comunication" to --communication--

Column 2,
Line 61, before "teaching of the present invention" change "of" to --with the--

Column 4,
Line 44, after "broken away" insert --,--
Line 52, after "broken away" insert --,--

Column 5,
Line 1, after "variable optical tap" insert --,--
Line 6, after "variable optical tap" insert --,--

Column 7,
Line 8, after "Alternatively" insert --,--
Line 33, before "the first array of waveguides" change "invention" to --invention,--
Line 40, after "end (b) of waveguides" change "51-a" to --51-58--
Line 54, after "waveguides 50 and 60" insert --which--
Line 61, before "angle θ" change "application" to --application,--

Column 8,
Line 4, after "For other applications" insert --,--
Line 5, after "may be" change "change" to --changed--
Line 13, after "illustration only" insert --,--
Line 27, after "an appropriate source" insert --,--
Line 34, before "optical device 140" change "noted" to --noted,--
Line 46, change "Optical signal level" to --The optical signal level--
Line 51, change ""variable splitter."." to --"variable splitter".--
Line 65, change "through waveguide 58" to --through waveguide 58,--

Column 9,
Line 1, change "through waveguide 58" to --through waveguide 58,--
Line 5, change "the first array" to --the first array,--
Line 20, before "the amount of electrical currents" remove [both]
Line 56, before "a benzocyclobutene" change "applications" to --applications,--
Line 56, change "polymer dielectrics" to --polymer dielectric--

UNITED STATES PATENT AND TRADEMARK OFFICE
CERTIFICATE OF CORRECTION

PATENT NO. : 6,778,736 B2
APPLICATION NO. : 10/098050
DATED : August 17, 2004
INVENTOR(S) : Marwardt et al.

It is certified that error appears in the above-identified patent and that said Letters Patent is hereby corrected as shown below:

Column 10,
Line 6, after "eighty micrometers" change "(80 mm)." to --(80 μm).--
Line 8-9, after "micrometers" change "(125 mm)." to --(125 μm).--
Line 14, after "micrometers" change "(6 or 7 mm)." to --(6 or 7 μm).--
Line 22, after "micrometers" change "(15 mm)" to --(15 μm)--
Line 32, change "FIG. 4a," to --FIG. 3,--
Line 41, after "2.4 micrometers" change "(2.4 mm)." to --(2.4 μm).--
Line 53, after "five micrometers" change "(5 mm)." to --(5 μm).--

Column 11,
Line 3, change "Various features" to --various features--
Line 11, before "is perferably" remove [may be]
Line 14, after "capped or not" change "connect" to --connected--
Line 21, before "by optical device" change "direct" to --directed--
Line 27, before "is approximately" change "10a" to --101a--

Column 13,
Line 9, after "For one embodiment" insert --,--
Line 11, after "of approximately" remove [of]
Line 23, after "For other applications" insert --,--
Line 30, after "For still other applications" insert --,--
Line 47, before "optical signal level" insert --the--

Column 14,
Line 49, after "variable optical attenuator" change "60" to --260--
Line 55, after "FIG. 12" insert --,--
Line 63, change "preferable intersects" to --preferably intersects--

Column 15,
Line 2, after "For some applications" insert --,--
Line 5, change "set (301-340). In" to --set (301-340) in--
Line 7, before "dynamic variable optical attenuator" change "12" to --12,--
Line 9, after "electrode heater" change "30" to --80--
Line 13, after "In a similar manner" insert --,--
Line 18, before "signal level" insert --the--

UNITED STATES PATENT AND TRADEMARK OFFICE
CERTIFICATE OF CORRECTION

PATENT NO. : 6,778,736 B2
APPLICATION NO. : 10/098050
DATED : August 17, 2004
INVENTOR(S) : Marwardt et al.

It is certified that error appears in the above-identified patent and that said Letters Patent is hereby corrected as shown below:

Column 16,
Line 23, change "formed in party" to --formed in part--

Signed and Sealed this

Fifteenth Day of August, 2006

JON W. DUDAS
*Director of the United States Patent and Trademark Office*